United States Patent Office 3,004,480
Patented Oct. 17, 1961

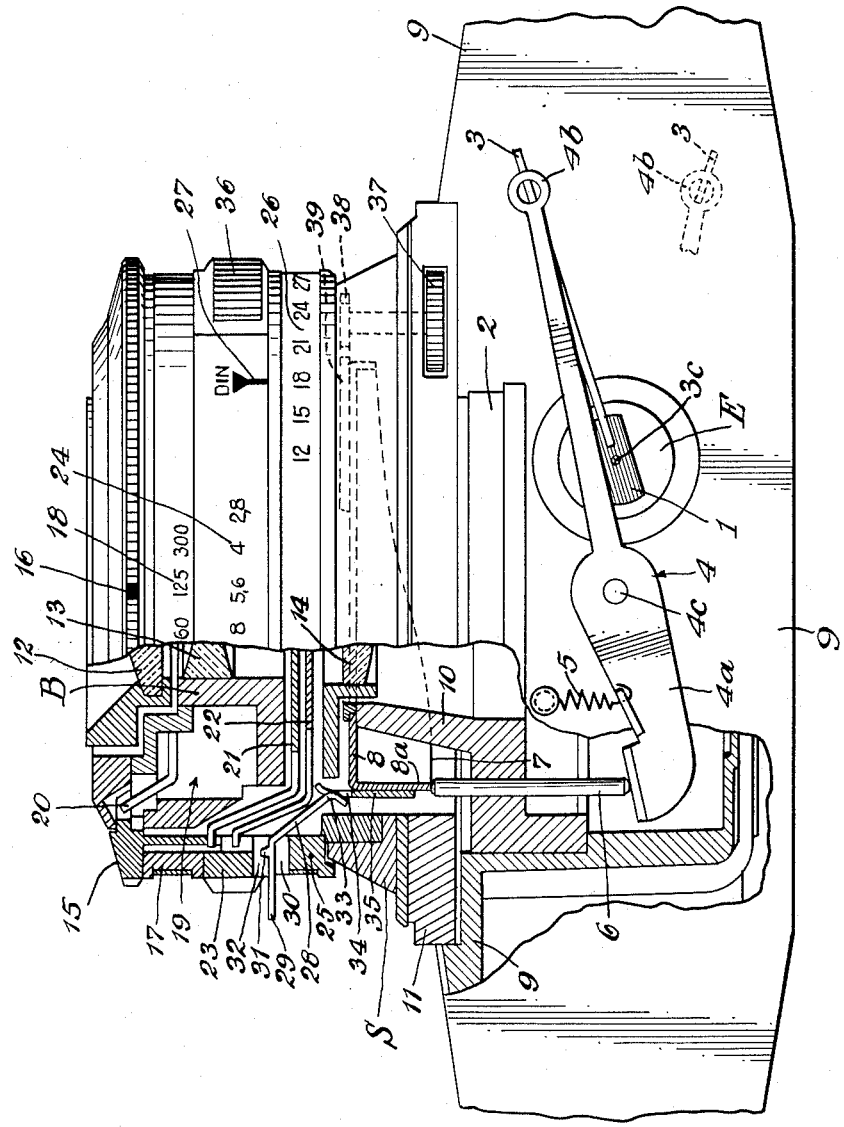

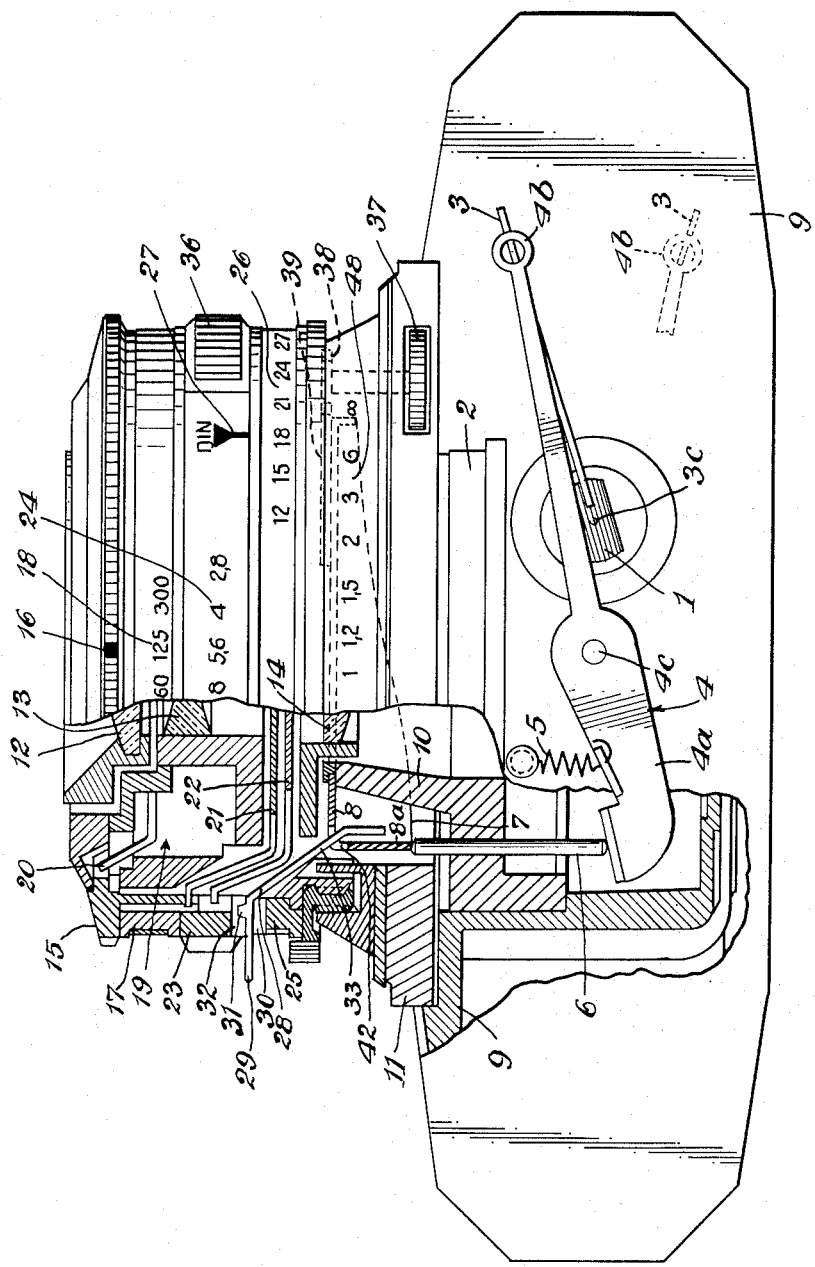

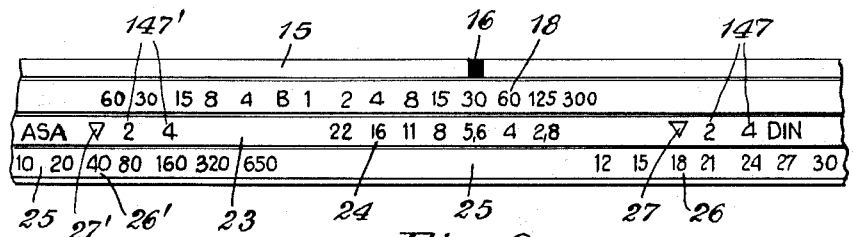
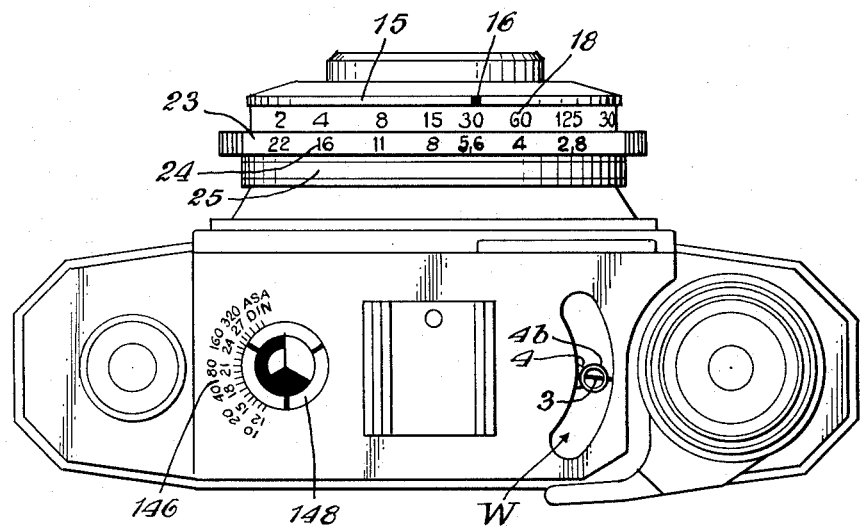
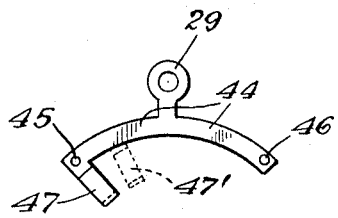
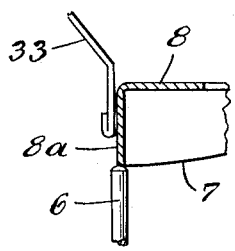
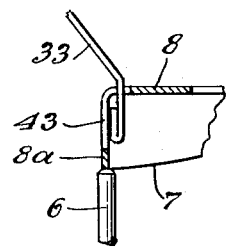
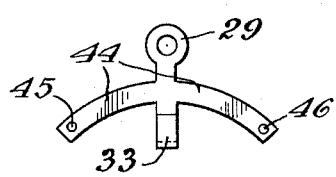
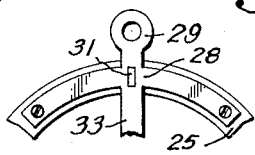

3,004,480
PHOTOGRAPHIC CAMERA WITH A COUPLED PHOTOELECTRIC EXPOSURE METER
Edgar Sauer and Johann Hahn, Stuttgart, and Horst Wutzler, Stuttgart-Degerloch, Germany, assignors to Zeiss Ikon A.G. Stuttgart, Stuttgart, Germany
Filed Nov. 26, 1957, Ser. No. 699,118
Claims priority, application Germany Nov. 30, 1956
3 Claims. (Cl. 95—10)

In cameras equipped with a photoelectric exposure meter it is known to couple the follow-up member of the exposure meter, such as a follow-up pointer which has to be brought into coincidence with the pointer of the measuring instrument, with the diaphragm and/or the shutter speed adjusting device. The coupling includes a cam drive which modifies the characteristics of the deflection of the instrument. Such a type of a cam drive heretofore formed a part of the calculating device of the exposure meter and was built into the exposure meter to form a unit with the same.

In contrast to the above mentioned arrangement of the cam drive of the exposure meter the present invention employs this cam drive at a separate location, namely, in the operative connection leading from the exposure meter to the adjusting member (diaphragm and/or shutter speed adjusting member) of the camera. It now is possible to advantageously arrange the connecting gearing in accordance with the prevailing camera conditions. The exposure meter itself is simplified and can easily be inserted into the mechanism and the available space in the camera in a more advantageous manner. The cam of the cam drive can advantageously be placed around the optical axis of the camera. Such an arrangement will provide a satisfactory connection with the exposure adjusting members on the camera objective, regardless of whether only the diaphragm device is disposed at the objective or a central shutter which includes a diaphragm adjusting device and a shutter speed adjusting device. A particularly simplified arrangement of the entire mechanism is obtained when the objective shutter is provided with a diaphragm device having one control ring which is adjusted according to time values and having another control ring adjusted according to light values. In such a case a single connecting train will be sufficient between the cam drive of the follow-up member for the exposure meter and the light value adjusting member of the diaphragm device in order to obtain a complete coupling of diaphragm aperture and shutter speed. Instead of the follow-up pointer which has to be brought in coincidence with the pointer of the measuring instrument the follow-up member may, for instance, consist of the measuring instrument itself which is adjustable as a unit in which the adjustment of said instrument causes the deflected instrument pointer to return to a stationary index mark.

The present invention is applicable to cameras provided with only a front lens adjustment and may even be equipped with an interchangeable front lens as well as to cameras in which the entire objective is adjustable as a whole and even may be interchangeable as a unit. The invention will be described hereinafter as applied to cameras equipped with an adjustable or interchangeable front lens and also as applied to cameras equipped with an objective which is adjustable as a whole or is interchangeable as a whole.

Finally, means will be described which will consider not only the film speed together with the adjustment of the follow-up pointer of the exposure meter when the latter is adjusted to the diaphragm aperture and/or the shutter speed but also will consider exposure factors, for instance, the use of filters.

These and other features of the present invention will now be described with reference to a few modifications shown in the accompanying drawings, wherein:

FIG. 1 shows diagrammatically in a top plan view and partly in a horizontal sectional view a camera provided with an adjustable and, if desired, an interchangeable front lens for focusing, wherein the cam drive is provided at a location which is spaced from the exposure meter and is disposed in the operative connection to the exposure adjustment member (diaphragm and/or shutter speed adjusting member);

FIG. 2 shows in similar manner as FIG. 1 a camera with an objective which is displaceable as a whole for focusing and, if desired, may be interchangeable as a whole;

FIGS. 3, 4, 5 and 6 show details of the camera shown in FIG. 2;

FIG. 7 shows a top view of a camera equipped with a built-in exposure meter which is operatively connected with the exposure adjusting devices;

FIG. 8 shows an evolute view of the scale arrangement of the camera shown in FIG. 7;

FIG. 10 is a fragmentary plan view illustrating the manner in which the coupling member is secured to the additional ring.

Figure 9:
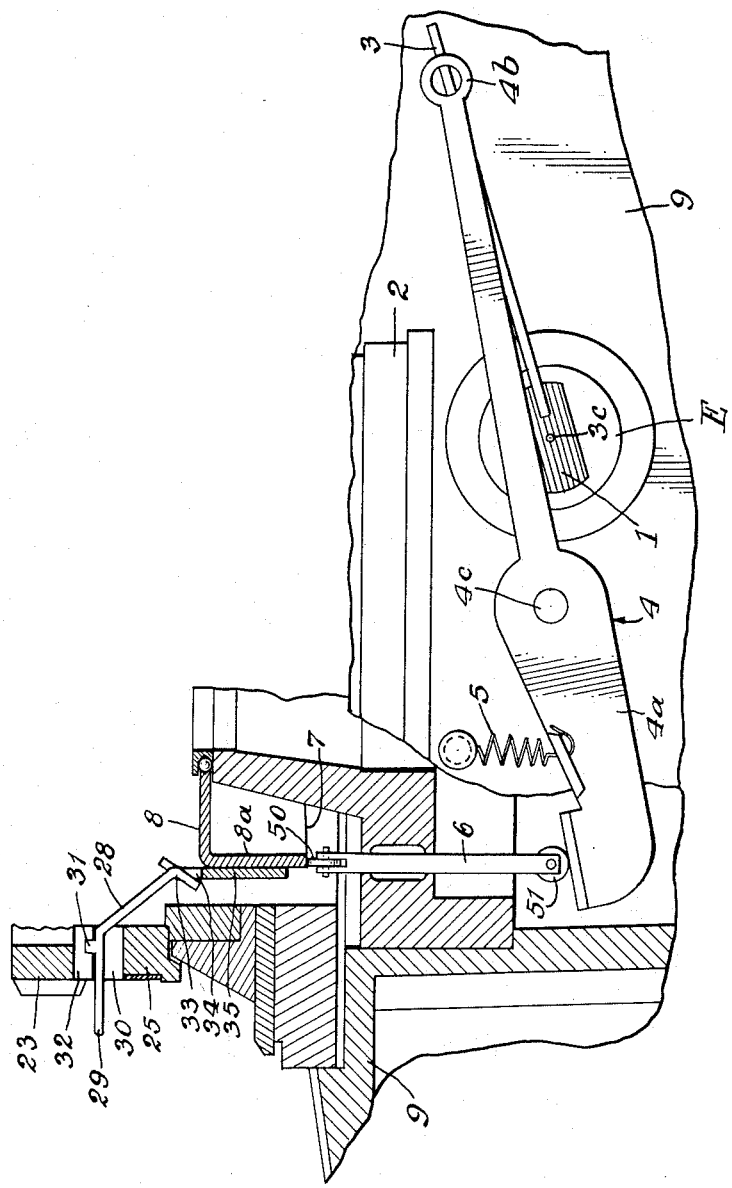
FIG. 9 illustrates a modified construction of the operative connection between the diaphragm adjusting ring and the follow-up pointer of the exposure meter.

Referring to FIG. 1, the exposure meter E is disposed in the upper part of the camera casing 9. Its moving coil measuring instrument 1 is energized by the electric current produced in a light sensitive cell disposed at 2 and causes a corresponding deflection of the moving coil measuring instrument pointer 3. A double armed follow-up pointer 4 is arranged to cooperate with said pointer 3 of the instrument. The follow-up pointer 4 is rotatably mounted between its ends about an axis 4c which is arranged eccentrically with respect to the axis of rotation 3c of the moving coil of the measuring instrument 1. A coil spring 5 holds the arm 4a of the follow-up pointer 4 in contact with one end of a slidably arranged pin 6 whose other end engages a cam edge 7. The latter is formed on the rear edge of a cylindrical wall 8a of a cup 8 which has a central aperture and is rotatable about the optical axis of the objective camera. The cup 8 is rotatably supported on the outer end of a tapering flange 10 secured in the camera casing 9.

A mounting plate 11 on the front wall of the camera casing 9 has mounted thereon a central shutter S. The latter also supports the camera objective B which, for instance, comprises a front lens 12 which may be exchangeable, a center lens 13 and a rearward lens 14. The last named lens may be disposed in such a manner that it comes to lie in the space formed by the flange 10 and may even be attached to the flange 10, instead of being fastened in the central shutter. The front of the central shutter has arranged thereon a shutter speed adjusting ring 15 with an indicator mark 16. The latter cooperates with a stationary shutter speed scale 18 arranged on the shutter housing 17. The connection between the shutter speed adjusting ring 15 and the shutter driving mechanism arranged in the space 19 is indicated by the arm 20. The shutter blades (which are not shown) are arranged between the center lens 13 and the rear lens 14. Here, also are disposed the diaphragm segments. The opening of said diaphragm segments is effected by control rings 21 and 22, each of which is rotatable around the optical axis. The control ring 21 is connected with the shutter speed adjusting ring 15. A diaphragm adjusting ring 23 is rotatably arranged around the shutter housing and is connected with the control ring 22. The ring 23 carries a linear diaphragm scale 24 arranged in such a manner that the values on said scale, together with the adjacent values of the stationary shutter speed scale 18 form pairs of the same light value, i.e., they represent the different possible combinations of diaphragm aperture and shutter speed values, all of which will produce the same exposure and thus an equal blacking of the film. The camera is adjusted to the pair of values which is shown on the shutter speed adjusting ring 15 opposite the mark 16. In the example shown, the shutter speed is 1/25 of a second and the diaphragm aperture 5.6.

The light value furnished by the exposure meter has to be inserted into the diaphragm control ring 22. In order to indicate its value it would be possible to provide a light value scale opposite the instrument pointer 3 of the exposure meter—and a similar scale could be provided on the adjusting ring 23 which cooperates with a stationary mark disposed approximately adjacent the shutter speed scale 18. However, such an indicating arrangement is not necessary. The coupling with the exposure meter makes such an indicating arrangement superfluous. However, an additional ring 25 is provided in the present embodiment shown. This ring 25 carries a film speed scale 26 which cooperates with a mark 27 disposed on the diaphragm adjusting ring 23. The rings 23 and 25 are releasably coupled with each other and may assume different rotative positions relative to one another, the coupling being effected, for instance, by an appropriate member 28 (FIGURE 10) secured as by suitable fastener elements located at the ends thereof to the additional ring 25 and as also described in connection with the modifications shown in FIGURES 5 and 6. An arm 29 of the member 28 which is in the form of a handle is urged yieldingly in the direction of the optical axis into a recess 30 of the ring 23. The arm 29 has a projection 31 engaging one of a series of notches 32 in the adjustment ring 23. A downward pressure of the handle 29 will move the projection 31 out of engagement with the ring 23 and then the rings 23 and 25 can be rotated relative to each other in such a manner that the mark 27 can be moved opposite that value on the scale 26 which will correspond to the speed of the film used in the camera. When the handle 29 is released the projection 31 will come into engagement with one of the notches 32 and will thus couple or lock the rings 23 and 25 together. The connection with the cup 8 is established by an arm 33 on the member 28. The arm 33 engages a notch 34 (FIG. 9) in a plate 35 which is fastened to the cup 8. The parts 33, 34 thus form a releasable and detachable slidable coupling which enables the connection of said cup which is built into the camera with the ring 25 when the shutter unit is axially moved during its attachment to the camera casing. It is advisable to make the arm 33 or the plate 35 transversely somewhat yieldable. In case these two parts 33 and 34 are not disposed opposite each other when the shutter unit is attached these parts can subsequently be brought into snapping engagement with each other by rotation of the ring 25.

The curved edge 7 formed on the cup 8 could also be designed in the form of a flat disc with a curved circumferential edge. In the form of a cup, however, the curved edge protrudes radially to a smaller extent and thus provides more favorable transmission conditions. For this purpose, it is of advantage to arrange the curved edge 7 of the cup to be directed inwardly into the camera casing. When the entire cam drive 6, 7, 8 is supported in the camera casing as shown in the drawings, a particularly advantageous mounting is obtained, permitting easy repairs and a very easy installation and testing of the built-in exposure meter. On the other hand, it is also possible to arrange the cam drive or parts thereof in any interchangeable objectives or in the shutter unit of the camera.

The purpose of the cam drive 6, 7, 8 is to transmit the adjusting movements between the diaphragm or shutter and the follow-up member of the exposure meter. This cam gearing is particularly suitable for the necessary translation and conversion of the respective movements. On the other hand, the cam drive will compensate for the non-linear deflection of the exposure meter in relation to the linearity of the shutter and diaphragm graduations. These two functions are superimposed one upon the other in the curved shape 7 of the flange on the cup 8. The curved edge also incorporates the film speed. The film speed could also be considered in a different manner, for instance, by means of an appropriate diaphragm arranged in front of the light sensitive cell of the exposure meter. The camera can be operated in a number of different arrangements. In the described embodiment one may observe the exposure meter by viewing the upper surface of the camera. The adjustment of the follow-up pointer is effected by a manual rotation of the diaphragm aperture adjustment ring 23 which for this purpose is provided with a knurled surface portion 36. There is no manually operable adjusting member provided on the exposure meter. The indication of the exposure meter can also be exclusively or additionally made visible in the finder of the camera. In such a case it is advisable to provide alone or additionally a knurled wheel 37 projecting from the front plate 11 of the camera. This wheel 37 can easily be actuated by the finger of a hand holding the camera ready for operation in front of the eye. This wheel 37 actuates a gear 38 and the latter meshes with a gear segment 39 secured to the cup 8. It is also possible to have the wheel 37 directly actuate the adjusting ring 23.

In the disclosed embodiment the cam drive is arranged in such a manner that the cup 8 is in operative connection with the diaphragm adjusting member 23 on the shutter and its feeler pin 6 is in operative engagement with the follow-up member 4 of the exposure meter. Considering that the small inclination angle of the curved edge 7 on the cup is self-locking on one side where the pin 6 engages, the selected arrangement requires an operation of the same from the diaphragm so that an actuating member, for instance, the knurled portion 36 must be provided on the shutter housing to actuate from here the follow-up pointer 4 of the exposure meter. This operating arrangement is particularly advantageous for a camera such as shown in the drawings, but it is also possible to provide for other types of cameras a manual adjustment at the exposure meter. In such a case the cam drive 6, 7, 8 will be arranged in reverse, namely, an operative connection of the cup member 8 with the follow-up pointer 4 and an operative engagement of the feeler pin 6 with the diaphragm adjusting ring 23.

According to the present invention the cam gearing may be designed in such a manner that by an appropriate selection of the inclination agle of its curve 7 and/or by any other friction reducing means such as a ball bearing 49 and rollers 50 and 51, respectively, FIG. 9, on the feeler pin 6 the cup can be driven from both sides. In such a case an appropriate arrangement of the actuating means would permit an adjustment of the follow-up pointer 4 of the exposure meter by the diaphragm aperture adjusting member 23 on the shutter or by a member arranged on the camera casing.

In order to apply the above-mentioned objects of the invention to designs of cameras which have an objective which is axially displaced as a whole during focusing, including the built-in central shutter in which the camera objective as a whole can be interchanged, special means are provided in addition to the range adjustment which may be accomplished by a worm gear and means for interchanging of the objective. These special means will assure an engagement between the exposure-adjusting member (diaphragm aperture adjusting member and/or shutter speed adjusting member) and the cam drive, regardless of the axial extension produced by the axial movement of the objective relative to the camera body.

These means for maintaining the engagement between the exposure adjusting member on the one hand and the cam drive on the other hand comprise in accordance with another object of the present invention, a coupling preferably a detachable and releasable slidable coupling which is provided with a means for extending the coupling member, when the objective is axially moved to its maximum extension.

The cam of the cam drive is disposed around the optical axis of the camera. Its design as a cup is particularly advantageous in that the curved edge projects radially to a small extent and provides a better transmission.

In the case of a camera objective which is only axially adjustable but not interchangeable, the cam member is provided with a recess regardless of whether the cam member consists of a flat disc provided on its circumference with a curve or whether it consists of a cup having a curved edge on the flange of the same. Said recess is used for the reception of the coupling member in axial direction. The coupling element is provided with a vertical portion having a resilient center section and attachment points at the ends of said vertical portion by means of which the vertical portion can be connected with an exposure adjusting member. The coupling member engaging the cam branches off from one of said attachment points or near the same.

If, however, the arrangement is such that the camera objective is not only axially adjustable but is also interchangeable then the cam drive is provided with a longitudinal and/or slot-shaped recess for receiving the coupling member. The coupling member in such a case is designed in the form of a yieldable tongue or the like which will laterally engage the respective edge of the curved cam when the camera objective is attached to the camera casing. The coupling member used in this particular case differs from the coupling element for the known interchangeable objective. The main difference consists in this, that instead of a coupling projection branching off from the said connecting point or adjacent to the same it is provided with a coupling projection which branches off from the yieldable middle portion of the coupling member and thus is capable of yieldably engaging the edge of the curved cam unless an immediate coupling is obtained by engagement of the coupling member into the recess or the slot. If such an immediate engagement is not effected, the necesary engagement is made by an adjustment of the curved cam for yieldable snapping into said recess or slot.

The just mentioned features of the present invention are shown in FIG. 2, wherein the parts similar to those shown in FIG. 1 are provided with the same numerals.

An arm 33 which is attached to the coupling members 28, 29 effects the coupling between the adjusting ring 23 and the cam or cup 7, 8. This coupling is effected when the arm 33 engages a slot in the cam when the latter has the form of a flat disc or has the form of a cup. The arm 33 extends in axial direction to such an extent that the engagement is maintained even when the axial displacement of the camera objective relative to the stationary camera casing has reached the maximum.

In the modification according to FIG. 2, in which a cam in the form of a cup 8 provided with a curved edge 7 is employed and in which modification an interchangability of the entire camera objective is not possible, the coupling member 33 engages an aperture 42 provided in the upper corner of said cup 8. This engagement is effected during the assembly of the camera. A different arrangement is shown in FIGS. 3 and 4, intended for a camera in which the objective can not only be axially adjusted as a whole but can also be interchanged. In order to enable an engagement in this case the cup 8 is provided with an axial slot 43 in its flange 8a—the size of the same being selected to the maximum extension of the engaging part of the coupling member 33. The coupling member 33 is rounded off, bent upon itself, or similarly beveled at its lower end. This will cause a sliding off of the coupling member on the upper edge of the cup 8 when the objective is attached to the camera. The coupling member will, however, enter the slot 43 or will resiliently be urged against the side wall of the cup when the slot is in a different position. By turning the cam 43 the coupling member 33 will snap into said slot 43 as soon as the coupling member 33 reaches the same.

Modifications of the coupling member are shown in FIGS. 5 and 6—showing the forms of same which are used when the objective cannot be interchanged, as well as in cases where the objective is interchangeable. In case an interchangeable arrangement of the objective is only desirable during the assembly of the camera the coupling member 33 is formed according to FIG. 5. In this modification the coupling element is provided with an arcuate strip 44 which is fastened with its ends 45 and 46 to the additional ring 25. A yieldable action of the coupling member which engages the cup is unnecessary and undesirable in this case so that a coupling projection branches off, as indicated by 47 respectively 47', from one of the fastening points or adjacent the same. But, when the arrangement includes an interchangeability of the camera objective the coupling member must be yieldable and then the coupling part 33 projects from the center portion of the coupling member 44 as shown in FIG. 6. This arrangement will thus assure a resilient engagement of the coupling member as indicated in FIGS. 3 and 4.

An important object of the present invention is that the device for adjustment of the camera, in accordance with the speed of the film, over which device the follow-up member of the exposure meter is coupled with the diaphragm and/or shutter speed adjusting device, is provided with means for considering additional factors, for instance, filter factors. This can be obtained in that the film speed scale is arranged adjacent filter factor scales. Thus the adjustment facilities of the camera are extended without using any additional parts.

The construction of such a camera is shown in FIG. 7. In a window W provided in the top wall of the camera casing are visible the line-shaped instrument pointer 3 of the exposure meter and the follow-up pointer 4 provided with a ring shaped indicator 4b. The two pointers 3 and 4 are brought to coincidence by turning the adjusting ring 23 which is provided with a diaphragm scale 24. The stationary shutter speed scale 18 is arranged opposite the diaphragm scale. The shutter speed adjusting ring 15 with the adjusting mark 16 is rotatably disposed opposite the last mentioned shutter speed scale 18. The paired values of the diaphragm aperture and shutter speed are adjustable and is indicated by the mark 16 of the shutter speed ring 15. See also FIG. 8.

A ring 25 is provided adjacent the adjusting ring 23 and can be releasably coupled with same in different relative positions. The ring 25 forms a part of the connecting gearing extending from the adjusting ring 23 to the follow-up member 4 of the exposure meter and is provided with a film speed scale 26 (according to DIN graduations) and 26' (according to ASA graduations). The scales 26 and 26' cooperate with marks 27, respectively 27' on the adjusting ring 23. They are each modified by the filter factor to scales 147 and 147', respectively. The scales 27, 147 and 27', 147' are disposed to the left and to the right at a certain distance from the diaphragm aperture scale 24. The film speed scales 26, 27' are also spaced a larger extent from each other, so that at least in normal operation, i.e., when the camera is adjusted to the usual values these scales will not be visible when the camera is viewed from above. This arrangement will prevent a multiplicity of simultaneously visible scales and thus eliminate the difficulty in adjusting the diaphragm and the shutter speed of the camera. On the other hand, it does not appear to be disturbing, after inserting a new film in the camera only on this one occasion—to tilt the camera somewhat for examining and adjusting it to the film speed by observing the indicating means 26, 27, respectively 26', 27'.

The same applies to the use of filters. In this case the film speed factor is adjusted not relative to the marks 27 or 27' but relative to the filter factors 147 or 147' as a reference mark, which correspond to the filters applied to the camera objective.

The arrangement of the scales 147, 147' will preclude at this place the reading of the film speed of the newly inserted film. It is therefore advisable to provide a film index disc (which is useful in any case). In the present modification such a film index disc 148 is arranged on the top wall of the camera casing. The index disc 148 shows in its surface sectors symbols for different types of films (daytime, color, artificial light-color and black and white films) and will enable the adjustment of the camera to the film speed of the film employed according to the DIN and ASA scales 146 (FIG. 7).

What we claim is:

1. In combination with a photographic camera, of a photo-electric exposure meter, comprising a camera casing having front and top walls with a photographic objective attached to the front wall and having a central shutter provided with a shutter speed adjusting member and a diaphragm aperture adjusting member, means coupling the shutter speed adjusting member to the diaphragm aperture adjusting member, said photo-electric exposure meter being mounted in the upper portion of said casing and including an electrical measuring instrument provided with a rotary pointer movable in a plane parallel to the top wall, a manually operated follow-up pointer adapted to be moved in a plane parallel to that of the instrument pointer so that a portion of said follow-up pointer may be moved into registry with a portion of said instrument pointer, and means including a coupling and a cam drive operatively connecting said diaphragm aperture adjusting member with said follow-up pointer, said cam drive including a cup-shaped annular member rotatably mounted on the camera and concentric with the axis of said objective and being provided with a peripheral flange the edge portion of which is shaped to form a cam surface, a pin slidably mounted in the camera having one end engaging said cam surface and the opposite end abutting said follow-up pointer whereby rotary movement of the cup-shaped member will move said follow-up pointer about its axis, said coupling including a yieldable spring-like member affixed to a control ring therefor and having a projection for drivingly engaging said cup-shaped member and another projection for normally engaging said diaphragm adjusting ring, said flexible member being adapted to be manually operated to disengage the second projection from one of a series of notches in said diaphragm adjusting member.

2. The combination with a photographic camera, of a photo-electric exposure meter comprising a camera casing having a front wall and a photographic objective having a central shutter with a shutter speed adjusting member and a diaphragm aperture adjusting member, means for coupling said diaphragm aperture adjusting member and said shutter speed adjusting member, said objective being mounted on the front wall of said camera, and said photo-electric exposure meter being mounted in the upper portion of said camera casing and including an electrical measuring instrument provided with a rotatably mounted pointer movable in a plane normal to the front wall of the camera, a rotatably mounted manually operated follow-up pointer rotatably supported by the camera and movable in a plane parallel to that of said pointer so as to be movable into registry with a portion of said instrument pointer, a cam drive and a coupling for operatively connecting said diaphragm aperture adjusting member to said follow-up pointer and said shutter speed adjusting member, said cam drive being arranged to translate the non-linear deflection of said measuring instrument pointer into a linear adjustment of said diaphragm aperture adjusting member and including a cup-shaped member having a cylindrical flange concentric with the photographic objective with the outer edge thereof shaped to form a cam surface, a pin axially and slidably mounted in said camera casing parallel to the optical axis of the objective and arranged with one end in engagement with said cam surface and the other end engaging said follow-up pointer, and a coupling member carried by a control ring and detachably engaging said diaphragm adjusting member, said coupling member having a projection for releasably engaging said cup-shaped member, whereby axial movement of said photographic objective relative to said cup-shaped member will be permitted.

3. In combination with a photographic camera, of a photo-electric exposure meter, comprising a camera casing having front and top walls with a photographic objective attached to the front wall having a central shutter provided with a shutter speed adjusting ring and a diaphragm aperture adjusting ring, a pair of independently rotatable diaphragm control rings, coupling means connecting one of the diaphragm control rings with said shutter speed adjusting ring, and means for coupling the other of said control rings with said diaphragm aperture adjusting ring, said photo-electric exposure meter being mounted in said camera casing and including an electrical measuring instrument provided with a rotatable pointer movable in a plane parallel to said top wall, a rotatably mounted follow-up pointer having a portion adapted to be moved into registration with a portion of said instrument pointer, means including a coupling and a cam drive operatively connecting said diaphragm aperture adjusting ring to said follow-up pointer, said cam drive including a cup-shaped member having a peripheral flange terminating at the edge in a cam surface, said coupling member including a yieldable plate-like member attached to a control ring and having a projection drivingly engaging said cup-shaped member and another projection releasably engaging said rotatably mounted diaphragm aperture adjusting ring, a portion of said plate-like member extending beyond the periphery of the objective whereby manual rotary movement thereof with said control ring will rock said follow-up pointer and movement of said member in an axial direction will disengage the second projection from one of a series of notches in said diaphragm aperture adjusting ring.

References Cited in the file of this patent

UNITED STATES PATENTS

| | | |
|---|---|---|
| 1,469,763 | Snyder et al. | Oct. 2, 1923 |
| 2,341,393 | Simmon | Feb. 8, 1944 |
| 2,343,257 | Hineline | Mar. 7, 1944 |
| 2,343,690 | Mihalyi | Mar. 7, 1944 |
| 2,874,622 | Gebele | Feb. 24, 1959 |

FOREIGN PATENTS

| | | |
|---|---|---|
| 756,282 | Germany | Feb. 23, 1953 |
| 1,096,379 | France | Jan. 26, 1955 |